Sept. 13, 1955  E. A. STALKER  2,717,554
FLUID MACHINE ROTOR AND STATOR CONSTRUCTION
Filed May 19, 1949  2 Sheets-Sheet 1

INVENTOR.
Edward A. Stalker

United States Patent Office 2,717,554
Patented Sept. 13, 1955

2,717,554

FLUID MACHINE ROTOR AND STATOR CONSTRUCTION

Edward A. Stalker, Bay City, Mich.

Application May 19, 1949, Serial No. 94,115

6 Claims. (Cl. 103—89)

My invention relates to fluid machines of the type providing for an interchange of energy between fluid and blades such as turbines, compressors and the like.

An object is to provide axial flow bladed structures which are cheap to fabricate.

Other objects will appear from the description, drawings and claims.

The above objects are accomplished by the means illustrated in the accompanying drawings in which—

Figure 1:
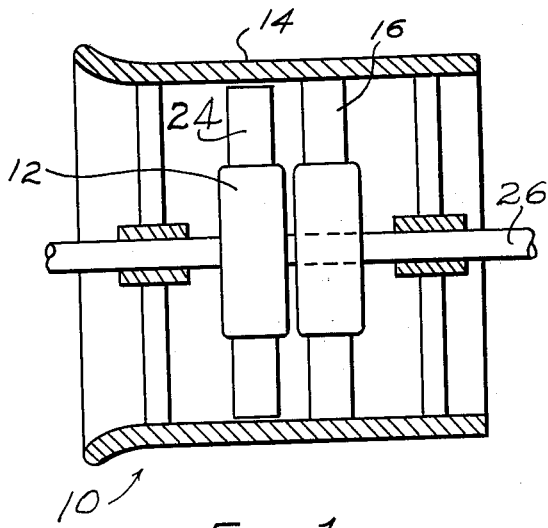
Fig. 1 is a fragmentary axial section of a rotor, case and stator of a fluid machine.
Figure 3:
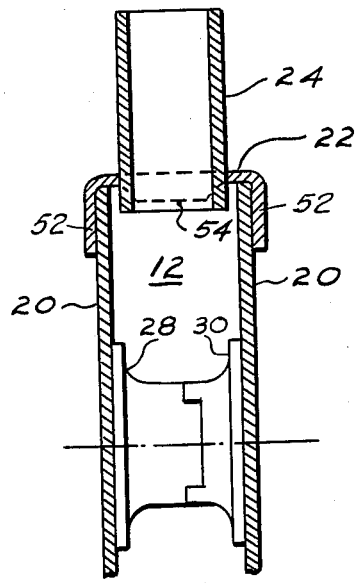
Fig. 3 is a fragmentary section on a further enlarged scale through a rotor along line 3—3 in Fig. 2.

In a bladed rotor of the axial flow type adapted to interchange energy with a fluid, the leading and trailing edges both extend radially outward adapting the blades to be bathed by fluid flowing across these edges in the general axial direction.

Referring to the drawings the fluid machine is indicated generally by 10. This is a machine adapted for the interchange of energy between fluid and blades.

The rotor 12 is mounted for rotation within the case 14 and the stator 16 redirects the fluid leaving the rotor. The stators are constructed similarly to the rotor but are fixed to the case.

The rotor comprises the side disks or webs 20, the cylindrical member or rim 22, the blades 24 and the hub elements 28 and 30. Preferably these are bonded to the side disks by soldering or welding and in turn are fixed to the shaft 26. The rotor hub includes hub elements 28 and 30, the side disks 20 and rim means 22.

Figure 6:
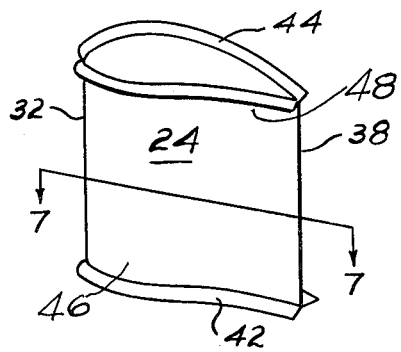
Fig. 6 is a perspective view of a blade.

The blades are each formed from a sheet folded at the leading edge 32 and the two free edges 34 and 36 are bonded together at the trailing edge 38 as shown in Fig. 6. At the ends the blades have flanges 42 and 44 respectively. The blades are commonly twisted and tapered from the root end 46 to the tip 48. Structures such as the blades formed by folding, pressing or stamping are herein called pressings.

Figure 2:
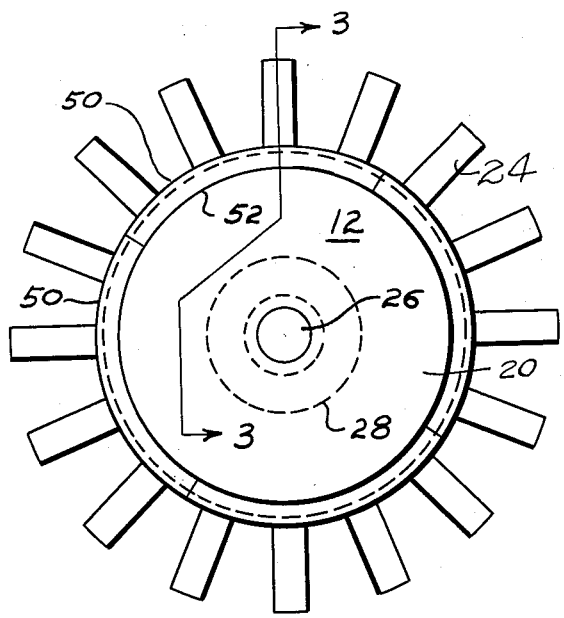
Fig. 2 is a front axial view on an enlarged scale of a rotor of Fig. 1.
Figure 4:
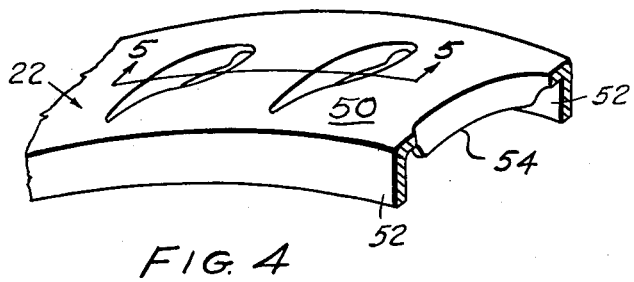
Fig. 4 is a fragmentary perspective view of a rotor rim.
Figure 5:
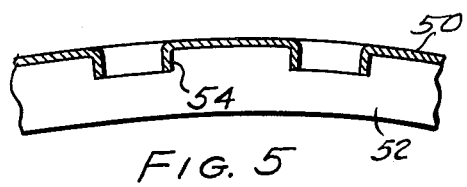
Fig. 5 is a section along line 5—5 in Fig. 4.

The cylindrical member or means may be made of segments 50 as shown in Figs. 2, 4 and 5 or it can be formed in one piece. It has a channel cross section with legs or flanges 52 directed radially inward. The cylindrical or peripheral surface of the rim is punched to provide a plurality of peripherally spaced holes defined by hole flanges 54 turned inward. The holes have a contour conforming to the root cross section of the airfoil shaped blade with the inside surfaces of the hole faying with the blade outer surfaces when the blades are inserted in the holes. The rim legs 52 like the hole flanges 54 are formed by pressing or stamping.

Figure 8:
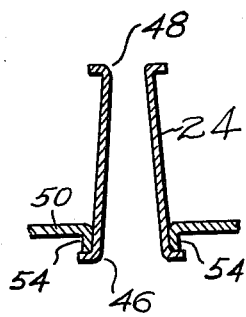
Fig. 8 is a radial section of a blade and a fragment of a rotor rim.
Figure 7:
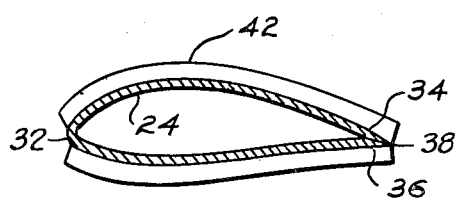
Fig. 7 is a view along line 7—7 in Fig. 6.

The blades are inserted radially outward through the holes in the cylindrical surface of the rim so that their span extends in a generally radial direction and the blade flanges are pressed against the ends of the hole flanges as shown in Fig. 8.

If the blade is not tapered significantly the tip flange is omitted if the blade is to be inserted radially outward through the rim.

In some fabrications the blade may be inserted from the outside in which case the blade root is flanged after insertion.

Preferably the blades are assembled in the rims and these are assembled on the side disks. The hub elements 28 and 30 may be assembled on the disks before the rims if these elements are to be on the inside, or later if they are placed on the outside.

The parts are held in suitable fixtures while being passed through a furnace to be soldered together. In this operation the blade trailing edges, the blade roots and rims, and the disks and rims are bonded together. The hub elements 28 and 30 may also be bonded to the disks in this operation.

Figure 9:
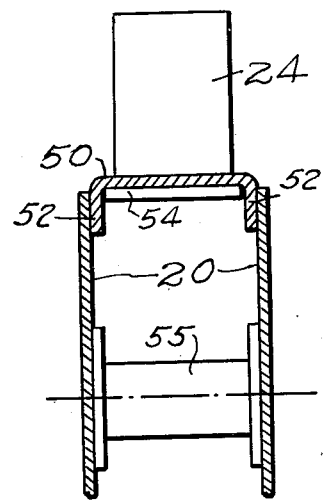
Fig. 9 is a fragmentary section through a rotor showing an alternate form of rotor construction.

Preferably the rim legs or flanges 52 overlap the side disks but they may also be placed on the inside of the disks as shown in Fig. 9.

Enough faying surfaces on the blade and the hole flanges can be provided to make a strong enough joint but the strength is very greatly magnified by the fact that blade flanges 42 are bonded to the inner ends of the rim hole flanges 54. The shear area at the rim flange ends is at right angles to the radius which is the direction of the centrifugal force and this right angle relation multiplies the effectiveness of the joint very greatly.

The side disks of Fig. 9 are spaced by the hub element 55 serving the same purpose as the hub elements 28 and 30.

It is important that each hole conforms in contour to the blade section at the hole for at least two reasons. A tight fit is desirable to make the strength of the solder high. It is also necessary to assure that the solder will fill the crevice and provide a smooth surface to be bathed by the flow. The solder always has a tendency to drop below the edges of the hole.

By making the blade hollow, not only is the blade itself made cheaply but it provides also a cheap means of attaching the blade to the rotor hub. Each wall of the root end of the blade can be inexpensively flared outward to form a flange. This flange in itself is not strong enough to support the blade in the hub against centrifugal force but when brazing, silver solder or the like is used to fuse the sides of the blade and the blade flanges to the end surface of the hole flange, a very strong joint results. The blade attachment is then far lighter than can be had with a solid blade and the common methods of attachment to the rotor hub. The flanges 54 constitute a beam means for transferring blade load to the side disks or plates.

By forming the blades from thin sheet metal especially with the blade side walls integral with each other across the blade nose, they are very light in weight and do not require a heavy blade base for attachment to the rotor rim. Since the blades are of limited wall thickness and weight, the hub rim can be of light weight since it does not have to support large centrifugal forces arising from the rotation of the blades. Just as the rim is of limited thickness and weight because the blades are, so the side plates are relatively of even more limited thickness and weight because the reductions in centrifugal stresses are magnified inward at an increasing rate making very great rotor weight savings. As will be observed from the figures the thickness of the walls of the parts making up the rotors are of the same order and may be substantially the same.

Since the parts are of relatively thin walls the various flanges are readily punched or pressed into shape and position. As is well known pressings are a very cheap manner of fabricating parts. A part of the economical advantage arises because the parts can be made from material of constant thickness such as commercial sheet metal, although the economical gain is not limited to constant thickness material.

While I have illustrated specific forms of the invention, it is to be understood that variations may be made therein and that I intend to claim my invention broadly as indicated by the appended claims.

I claim:

1. In combination in an axial flow rotor adapted to interchange energy with a fluid, a plurality of hollow sheet metal peripherally spaced axial flow blade structures comprising an outer blade portion and a root portion, said blade structure being defined by blade walls of limited thickness adapting said blades to be pressings, a rim means having spaced radially directed flanges defining a plurality of peripherally spaced holes in the peripheral surface of said rim means, said rim means having radially inward extending legs, each said blade structure extending outward through a said hole and having a substantial length of blade surface faying with each said flange of the respective said hole, each said blade being fixed to its respective said hole flanges by fused metal, the walls of said blade structure which extend inward from said rim means having substantially the same thickness as said blade walls outwardly external to said rim means to limit the centrifugal force on said rim means from said blade structure, said limited thickness and weight of said blade structure adapting said rim means to have limited thickness and weight, and side disks spaced apart axially supporting said rim means and blade structures therebetween against centrifugal force from said rim means and blade structures, said legs faying with the side surfaces of said side disks in a radial direction, said hole flanges extending axially substantially up to said legs, said limited thickness and weight of said rim means and blades adapting said rim means and side disks to have thicknesses comparable to the thickness of said blade walls.

2. In combination in an axial flow rotor adapted to interchange energy with a fluid, a plurality of hollow sheet metal peripherally spaced axial flow blades having blade walls of limited thickness adapting said blades to be pressings, a rim means having legs directed radially inward and pairs of radially directed flanges defining a plurality of periphery spaced holes in the peripheral surface of said rim means, each said blade extending outward through a said hole and having a substantial length of blade surface faying with each said flange of the respective said hole, each said blade being fixed to its respective said hole flanges by fused metal, said limited thickness and weight of said blades adapting said rim means to have limited thickness and weight, and side disks spaced apart axially supporting said rim means and blades therebetween against centrifugal force from said rim means and blades, said legs faying with the side surfaces of said side disks in a radial direction and being fixed thereto, said hole flanges extending axially substantially up to said legs, said limited thickness and weight of said rim means and blades adapting said rim means and side disks to have comparable wall thicknesses.

3. In combination in an axial flow rotor adapted to interchange energy with a fluid, a plurality of hollow sheet metal peripherally spaced axial flow blades having their span extending in a generally radial direction and having blade walls of limited thickness, a generally cylindrical sheet metal member defining a rotor rim having a plurality of peripherally spaced blade shaped holes defined by flanges extending radially, said rim also having radially extending legs on its opposite sides, each said blade extending radially outward through a said hole and having a substantial length of blade surface faying with each said flange of said hole, each said blade having a flange extending transversely to the blade span and faying with the inner edge of each said hole flange, said blade flange being fixed to said hole flange by fused metal along the fayed surfaces thereof, said limited thickness and weight of said blades adapting said rim to have limited thickness and weight, and side disks spaced apart axially and secured to said legs over a substantial radial extent supporting said rim and blades therebetween against centrifugal force from said rim and blades, said limited thickness and weight of said rim and blades adapting said rim and side disk to have comparable thickness.

4. An axial flow rotor as defined in claim 3 in which said rim includes integral portions laterally of said holes extending continuously in the peripheral direction over a plurality of said blades.

5. In combination in an axial flow rotor adapted to interchange energy with a fluid, a plurality of hollow sheet metal peripherally spaced axial flow blades having blade walls of limited thickness adapting said blades to be pressings, a rotor rim means having radially inwardly extending legs, said rim means having a plurality of holes therein spaced peripherally, each said blade being fixed in a said hole to said rim means and having its leading and trailing edges extending radially outward, said limited thickness and weight of said blades adapting said rim means to have limited thickness and weight, and side disks spaced apart axially supporting said rim means therebetween against centrifugal force due to the weight of said rim means and blades, each said leg faying with an inside surface of a said disk and being fixed thereto over a substantial radial extent of surface to surface contact subject to stress in shear for transmitting said force, said legs being substantially parallel.

6. In combination, a plurality of sheet metal parts adapted to form an axial flow rotor comprising a plurality of peripherally spaced axial flow blades having their span extending in a generally radial direction and having blade walls of limited thickness and weight, said walls being integral across the nose of each said blade and being fixed together at the trailing edges thereof, a generally cylindrical rotor rim means extending continuously from the leading to the trailing edges of the blades and from blade to blade in the peripheral direction adjacent the roots of the blades, said rim means having holes spaced therein for receiving the individual blades therethrough with the edges of said holes permanently fixed to the adjacent walls of the blades, side disks extending radially outwardly adjacent said rim means, and legs on opposite sides of said rim means overlapping and fixed at opposite sides to said side disks over a substantial radial extent for supporting the centrifugal forces developed in rotation.

References Cited in the file of this patent

UNITED STATES PATENTS

| Number | Name | Date |
|---|---|---|
| 1,484,579 | Still | Feb. 19, 1924 |
| 1,530,249 | Eveleth | Mar. 17, 1925 |
| 1,603,966 | Lorenzen | Oct. 19, 1926 |
| 1,668,972 | McCauley | May 8, 1928 |
| 2,313,413 | Weske | Mar. 9, 1943 |
| 2,337,619 | Miller | Dec. 28, 1943 |
| 2,345,918 | Dahlstrand | Apr. 4, 1944 |
| 2,373,558 | Haigh | Apr. 10, 1945 |
| 2,435,427 | Eastman | Feb. 3, 1948 |
| 2,436,087 | Benson | Feb. 17, 1948 |
| 2,443,830 | McDaniel | June 22, 1948 |
| 2,475,772 | Allen | July 12, 1949 |
| 2,503,072 | Schneider | Apr. 4, 1950 |
| 2,601,969 | Eastman et al. | July 1, 1952 |

FOREIGN PATENTS

| Number | Country | Date |
|---|---|---|
| 23,922 | Great Britain | of 1905 |
| 391,880 | Germany | July 29, 1924 |
| 573,481 | Germany | Apr. 1, 1933 |